United States Patent [19]

Murota et al.

[11] Patent Number: 4,949,821
[45] Date of Patent: Aug. 21, 1990

[54] AUTOMATIC TRANSMISSION

[75] Inventors: Kazuya Murota, Ebina; Takao Koyama, Atsugi, both of Japan

[73] Assignee: Nissan Motor Co., Ltd., Yokohama, Japan

[21] Appl. No.: 176,011

[22] Filed: Mar. 31, 1988

[30] Foreign Application Priority Data

Mar. 31, 1987 [JP] Japan .................................. 62-79334

[51] Int. Cl.⁵ .............................................. F16D 33/00
[52] U.S. Cl. ..................................... 192/3.21; 60/339; 384/280; 384/282
[58] Field of Search .................. 74/730, 688; 192/3.21, 192/3.33, 85 AA, 85 A; 60/339; 384/280, 281, 282

[56] References Cited

U.S. PATENT DOCUMENTS

| | | | |
|---|---|---|---|
| 1,970,024 | 8/1934 | Stockfleth | 384/281 |
| 2,635,021 | 4/1953 | Alward | 384/282 X |
| 2,821,095 | 1/1958 | Kelley | 192/3.21 X |
| 2,850,921 | 9/1958 | Knowles | 192/3.33 X |
| 3,001,415 | 9/1961 | Smirl | 192/3.33 X |
| 3,035,457 | 5/1962 | Cartwright | 74/730 |
| 3,084,003 | 4/1963 | Matt et al. | 384/280 X |
| 3,095,763 | 7/1963 | Kronogard | 74/730 X |
| 3,584,520 | 6/1971 | Borman | 74/688 X |
| 3,747,436 | 7/1973 | Hause | 74/759 X |
| 3,929,211 | 12/1975 | Maddock | 192/3.33 X |
| 4,315,443 | 2/1982 | Kubo et al. | 74/730 X |

FOREIGN PATENT DOCUMENTS 59-93565  5/1984  Japan .................................. 192/3.21

OTHER PUBLICATIONS

Mercedes-Benz, Engine/Chassis/Body/Units, TYP 190 E/190 D2.5 Japan, Mod. 201, Catalog A, 01/86.
Mercedes-Benz Service, Funktionsbeschreibung Automatisches Getriebe W4A040, 1981.

Primary Examiner—Leslie A. Braun
Assistant Examiner—Chris Campbell
Attorney, Agent, or Firm—Foley & Lardner, Schwartz, Jeffery, Schwaab, Mack, Blumenthal & Evans

[57] ABSTRACT

An automatic transmission for use in an automotive vehicle is comprised of an oil pump assembly adapted to discharge hydraulic oil as operating oil for the automatic transmission. The oil pump assembly is disposed around a stator shaft connected to the stator of a torque converter. The oil pump assembly includes a pump element drivably disposed in a pump housing and covered with a pump cover secured to the pump housing. The pump cover is made of light alloy and integrally formed with a boss inside which the stator shaft is fitted. The boss protrudes in a direction opposite to the pump housing. Additionally, a rigid ring is fitted on the outer periphery of the boss, thereby increasing the rigidity of the boss and preventing the outer peripheral section of the boss from being worn.

16 Claims, 1 Drawing Sheet

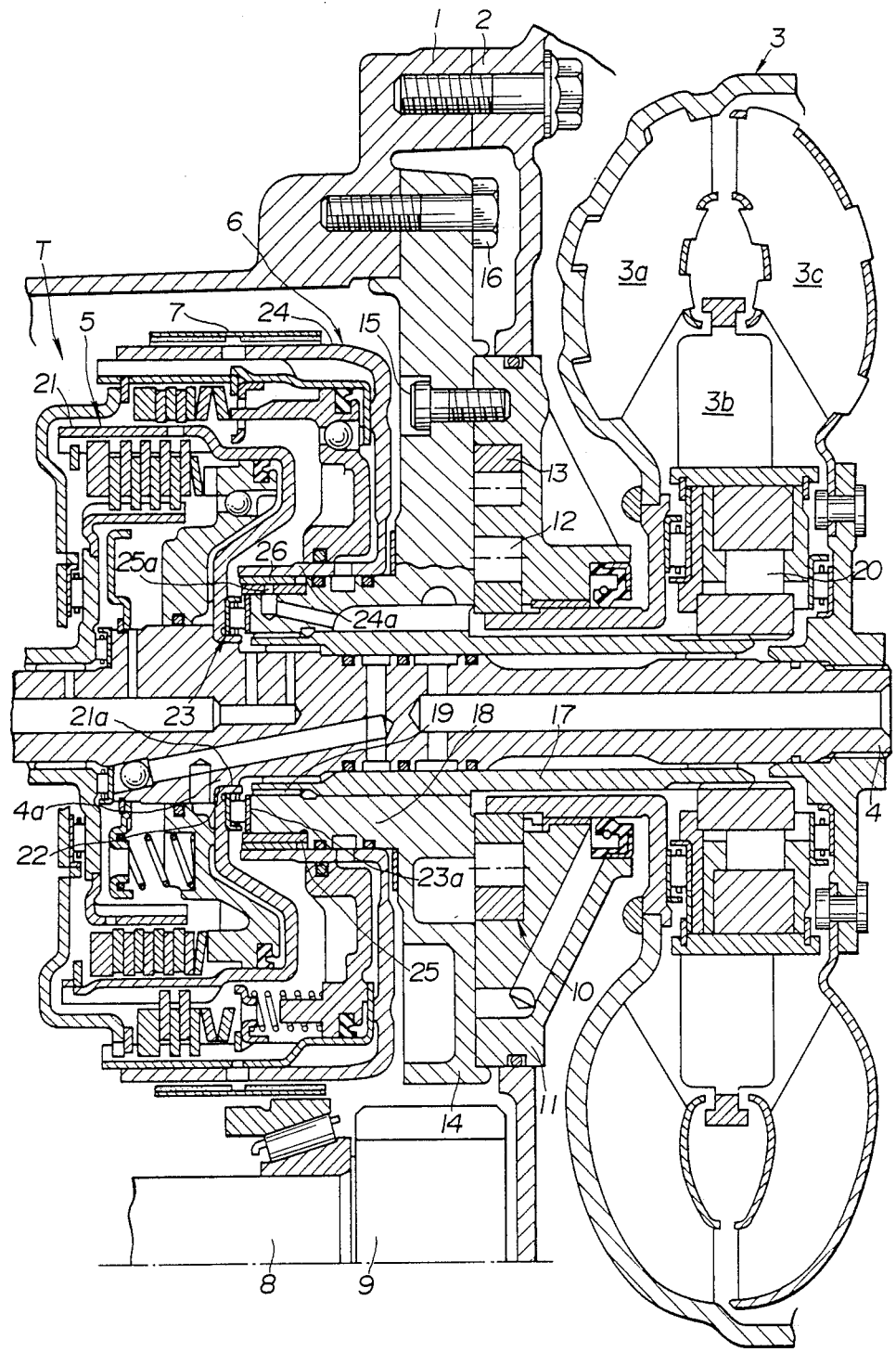

AUTOMATIC TRANSMISSION

BACKGROUND OF THE INVENTION

1. Field of the Invention

This invention relates in general to improvements in an automatic transmission, for example, for use in an automotive vehicle, and more particularly to an oil pump assembly of the automatic transmission including a boss securely receiving a stator shaft thereinside.

2. Description of the Prior Art

Automatic transmissions have been extensively used in automotive vehicles to automatically select speed changing stages by selectively hydraulically operating a variety of friction elements in connection with a transmission gear mechanism. Accordingly, an oil pump is essential for the automatic transmission in order to pressurize hydraulic oil serving as operating oil for the automatic transmission. The oil pump usually includes a pump element movably housed between a pump housing and a pump cover which are securely connected with each other. The oil pump is operatively interposed between a torque converter and the transmission gear mechanism and always driven by an engine. It is usual that a hollow stator shaft on which a stator of the torque converter is mounted is installed to the pump cover.

Now, if the pump cover of the large size is made of a heavy material such as cast iron regardless of unnecessity of supporting a large load. A weight increase is made in the automatic transmission. In this regard, it has been already put into practice that the pump cover is made of aluminum alloy. However, it is impossible that the stator shaft installed to the pump cover is made of aluminum alloy because the stator shaft receives reaction of the stator of the torque converter. Accordingly, the stator shaft is formed of a steel pipe and press-fitted to the pump cover so that they combine to form a one-piece structure.

In order to make efficient such press-fitting and to rotatably support the drum of a clutch of the transmission gear mechanism on the pump cover, the pump cover is integrally formed with a boss which projects axially in a direction opposite to the pump housing. The stator shaft is press-fitted into the boss from the direction of the pump housing.

However, difficulties have been encountered in such a pump cover arrangement, in which the rigidity of a part of the pump cover boss receiving the stator shaft is insufficient. In order to increase the rigidity, it is required to increase the thickness of the pump cover boss. This increases the diameter of component parts (such as a clutch drum) surrounding the boss, thereby making the outer diameter of the automatic transmission larger. Additionally, since the boss is integrally formed with the pump cover and made of aluminum alloy, the clutch drum rotatably supported on the pump cover boss wears the pump cover boss during a relatively short time period, thus shortening the life of the pump cover.

SUMMARY OF THE INVENTION

It is an object of the present invention to provide an improved automatic transmission which is arranged to increase the rigidity of a part of a boss of an oil pump cover which part receives a stator shaft and to prevent the outer peripheral section of the boss to be weared by a component part such as a clutch drum surrounding the boss.

Another object of the present invention is to provide an improved automatic transmission in which a rigid sleeve is fitted on the outer periphery of the boss of the oil pump cover.

The automatic transmission of the present invention is comprised of a generally cylindrical stator shaft connected to a stator of a torque converter. An oil pump assembly is disposed around the stator shaft and adapted to discharge hydraulic oil as operating oil for the automatic transmission. The oil pump includes a pump element movably disposed in a pump housing and covered with a pump cover which is secured to the pump housing and made of light alloy. The pump cover is integrally formed with a boss which axially protrudes in a direction opposite to the pump housing. The stator shaft is fitted inside the boss. Additionally, a rigid sleeve is fitted on the outer periphery of the boss and made of a material higher in mechanical strength than the light alloy.

With the thus arranged automatic transmission, the oil pump assembly discharges hydraulic oil upon the pump element being driven. The thus discharged oil is supplied under pressure to required parts under control thereby to carry out speed changing operation of the automatic transmission.

Although the pump cover integrally formed with the boss for receiving the stator shaft is made of light alloy for the purpose of weight-lightening of the automatic transmission, the rigidity of a part of the boss for receiving the stator shaft is maintained high by virtue of the rigid sleeve fitted on the periphery of the boss. Accordingly, the thickness of the boss can be reduced thereby to reduce the outer diameter of the boss. This can minimize the diameter of component parts surrounding the boss and accordingly the outer diameter of the automatic transmission. Additionally, the rigid sleeve effectively prevents the outer periphery of the boss from being worn by component parts rotatably supported on the boss outer periphery, thereby prolonging the life of the pump housing.

BRIEF DESCRIPTION OF THE DRAWING

The single FIGURE is a vertical sectional view of an essential part of an automatic transmission in accordance with the present invention.

DETAILED DESCRIPTION OF THE INVENTION

Referring now to the single FIGURE in the drawing, there is shown an essential part of an embodiment of an automatic transmission in accordance with the present invention. The automatic transmission is, in this embodiment, for an automotive vehicle and mechanically operatively connected to an automotive internal combustion engine (not shown). The automatic transmission is comprised of a transmission mechanism T housed in a transmission casing 1. The transmission mechanism T is mechanically operatively connected to a torque converter 3 housed in a converter housing 2. The torque converter 3 is operatively connected to the engine. In this automatic transmission, as usual, engine power output from the engine is transmitted through the torque converter 3 to the transmission mechanism T. Then, the engine power output is transmitted to a counter shaft 8 and a final drive pinion 9 through a transmission gear mechanism (not shown) of the transmission mechanism T. The transmission path of the engine power output in the transmission gear mechanism T is determined by selectively hydraulically operating a variety of friction elements including a high clutch 5, a reverse clutch 6 and a band brake 7 housed in the transmission casing 1.

An oil pump 10 is disposed to be located in a parting section of the casing 1 and the converter housing 2. The oil pump 10 is adapted to discharge under pressure hydraulic oil (or operating oil) which is used for speed change control, lubricating various parts and operation of the torque converter 3. The oil pump 10 includes internal and external gears (pump elements) 12, 13 which are in mesh with each other and rotatably disposed in a pump housing 11. More specifically, the internal and external gears 12, 13 are disposed in a containing groove (not identified) of the pump housing 11. The containing groove of the pump housing 11 is covered with a pump cover 14 which is fixedly secured to the pump housing 11 by means of bolts 15. Additionally, the pump cover 14 is further fixedly secured to the transmission casing 1 by means of bolts 16 so that the oil pump 10 is fixedly installed in position. In this installed position of the oil pump 10, the internal gear 12 is driven by a pump impeller 3a of the torque converter 3 and rotated to pressurize hydraulic oil supplied thereto.

In this embodiment, the pump cover 14 is made of light alloy such as aluminum alloy and integrally formed with a boss 18 which protrudes in a direction opposite to the pump housing 11. A cylindrical stator shaft 17 made of steel is tightly fitted in the bore of the boss 18 and extends through the central opening of the oil pump 10. In order to accomplish tight fitting of the stator shaft 17, the stator shaft 17 is press-fitted into the boss 18 from the direction of the pump housing 11 in such a manner that the inner periphery of the tip end of the boss 18 and the outer periphery of the tip end of the stator shaft 17 are fixedly engaged with each other by means of a serration 19. The stator shaft 17 is connected at its one end with a stator 3b of the torque converter 3 through a one-way clutch 20. An input shaft 4 is rotatably inserted in the bore of the stator shaft 17. A turbine 3c of the torque converter 3 is fixely mounted on the input shaft 4.

The high clutch 5 has a drum 21 which is fixedly mounted on the input shaft 4. More specifically, the drum 21 is formed at its inner peripheral part with a boss section 21a by burring machining. The boss section 21a is fitted on the input shaft 4, in which the fitting surfaces of them are welded with each other at a position indicated by the reference numeral 22 by electron beam welding or laser beam welding. Additionally, the drum 21 is suitably located in the axial direction of the input shaft 4 upon being pressed against the tip end face of pump cover boss 18 through a thrust bearing 23 fitted on the boss 21a of the drum 21.

The reverse clutch 6 includes a drum 24 whose inner peripheral cylindrical section 24a is rotatably fitted on the boss 18 of the pump cover 14. In this connection, the tip end section of the boss 18 is slightly reduced in diameter to form a smaller diameter section on which a rigid sleeve 25 is fitted by press-fitting. The rigid sleeve 25 is made of iron alloy or steel and has a such a length as to project from the free or tip end face of the boss 18. As shown, a race 23a of the thrust bearing 23 is fitted inside an end section of the rigid sleeve 25 which end section projects over the tip end face of the boss 18, thereby accomplishing centering of the thrust bearing 23. A bearing bushing 26 is fitted inside the end portion of the drum cylindrical inner peripheral section 24a, in which the centering of the drum 24 of the reverse clutch 6 is accomplished relative to the rigid sleeve 25 and the boss 18. Thus, the drum 24 is rotatably mounted at its cylindrical inner peripheral section 24a on the boss 18 through the bearing bushing 26 which slidably contacts with the outer periphery of the rigid sleeve 25.

Now, since the boss 18 is integrally formed with the pump cover 14 and made of aluminum alloy in an assembly of the pump cover 14 and the stator shaft 17, the boss 18 tends to deform in such a manner as to increase its diameter when stator reaction torque and/or torsion is applied to the stator shaft 17. However, such deformation of the boss 18 is effectively prevented by the rigid sleeve 25, thereby maintaining a high strength for securely receiving the stator shaft 17 at the position of the boss 18. Accordingly, it is unnecessary to increase the thickness of the boss 18, thereby reducing the thickness of the boss 18. This can reduce the outer diameter of the boss 18, thus achieving reduction of the diameter of component parts surrounding the boss 18 and accordingly the diameter of the automatic transmission.

Furthermore, the rigid sleeve 25 effectively prevents wear of the outer peripheral section of the boss 18 made of aluminum alloy, caused by friction of the drum 24 rotatably supported on the outer periphery of the boss 18, thereby improving durability of the boss 18 of the pump cover 14.

In the bearing structure of the reverse clutch drum 24, the rigid sleeve 25 projects into a useless space formed owing to existence of the thrust bearing 23, and therefore the length of the bearing bushing 26 is enlarged thereby to effectively use the useless space. This allows the boss 18 to be shortened, thus reducing the axial length of the automatic transmission.

Moreover, the centering of the race 23a of the thrust bearing 23 is accomplished by the projected end section of the rigid sleeve 25 which is independent from the boss 18 made of aluminum alloy, thereby improving the durability of the centering section of the thrust bearing race 23a. It is to be noted that the thrust bearing race 23a is singly detachable from the rigid sleeve 25 and therefore serves as a shim for adjusting the clearance between the thrust bearing 23 and the tip end face of the boss 18.

Additionally, since the rigid sleeve 25 is small-sized, an oil hole 25a for supplying oil for the bearing bushing 26 can be formed smaller in diameter for the reasons set forth below. In case of using no rigid sleeve (25) in which an oil hole is directly formed only in the boss 18, the diameter of the oil hole cannot be minimized below a certain level since the pump cover 14 is large-sized. However, in case of using the rigid sleeve 25 as in the present invention, the oil hole having a much smaller diameter can be formed. Thus, by forming the oil hole in the rigid sleeve 25, the diameter of the oil hole is adjustable, thereby increasing the freedom of control of lubricating oil to be supplied to the bearing bushing 26.

Thus, in the automatic transmission according to the present invention, the rigid sleeve 25 is press-fitted on the outer periphery of the boss 18 of the pump cover 14. Accordingly, even in case the boss 18 is formed of light alloy and integral with the pump cover 14, the rigidity of the boss 18 is maintained high at a location receiving the stator shaft 17. As a result, it is sufficient that the thickness of the boss 18 is smaller, and therefore the component parts (such as the drum 24) surrounding the boss 18 are small-sized thereby to enable the automatic transmission to be small-sized. Additionally, the rigid sleeve 25 effectively prevents wear of component parts (such as the drum 24) rotatably supported on the outer periphery of the boss 18, thereby improving the durability of the automatic transmission.

What is claimed is:

1. An automatic transmission comprising:
   a generally cylindrical stator shaft connected to a stator of a torque converter and made of steel;
   an oil pump assembly disposed around said stator shaft and including a pump housing, a pump element movably disposed in said pump housing, and a pump cover made of light alloy and fixedly secured to said pump housing to confine said pump element between it and said pump housing, said oil pump assembly being adapted to discharge hydraulic oil as operating oil for the automatic transmission;
   a boss formed integral with said pump cover and made of said light alloy, said boss axially protruding in a direction opposite to said pump housing, said stator shaft being fitted inside said boss; and
   a rigid sleeve coaxially fitted and fixedly secured on outer periphery of the said boss and made of a material higher in mechanical strength than said light alloy.

2. An automatic transmission as claimed in claim 1, further comprising an input shaft connected to a turbine of the torque converter and rotatably disposed inside said stator shaft.

3. An automatic transmission as claimed in claim 1, wherein said pump element of said oil pump assembly is drivably connected to a pump impeller of the torque converter.

4. An automatic transmission as claimed in claim 1, further comprising a thrust bearing disposed coaxial with said stator shaft and located between an end face of said boss and an annular member disposed coaxial with said stator shaft and said annular member secured to an input shaft connected to a turbine of the torque converter.

5. An automatic transmission as claimed in claim 1, further comprising a clutch including an annular drum which is disposed around said boss and has a cylindrical inner peripheral section rotatably fitted on an outer periphery of said boss.

6. An automatic transmission as claimed in claim 1, wherein said pump element of said pump assembly includes internal and external gears which are in mesh with each other, said internal gear being located around said stator shaft and drivably connected to a pump impeller of the torque converter.

7. An automatic transmission as claimed in claim 1, wherein said pump cover is perpendicular to axis of said stator shaft.

8. An automatic transmission as claimed in claim 7, said boss is coaxial with said stator shaft.

9. An automatic transmission as claimed in claim 1, wherein said boss has a tip end section which is smaller in diameter than other sections of said boss, wherein said rigid sleeve is tightly fitted an outer periphery of said tip end section.

10. An automatic transmission comprising:
    a generally cylindrical stator shaft connected to a stator of a torque converter and made of steel;
    an oil pump assembly disposed around said stator shaft and including a pump housing, a pump element movably disposed in said pump housing, and a pump cover made of light alloy and fixedly secured to said pump housing to confine said pump element between it and said pump housing, said oil pump assembly being adapted to discharge hydraulic oil as operating oil for the automatic transmission;
    a boss formed integral with said pump cover and made of said light alloy, said boss axially protruding in a direction opposite to said pump housing, said stator shaft being fitted inside said boss;
    a rigid sleeve coaxially fitted and fixedly secured on an outer periphery of said boss and made of a material higher in mechanical strength than said light alloy;
    a clutch including an annular drum which is disposed around said boss and has a cylindrical inner peripheral section rotatably fitted on an outer periphery of said boss; and
    a cylindrical bearing bushing disposed between said cylindrical inner peripheral section of said clutch and an outer periphery of said rigid sleeve.

11. An automatic transmission comprising:
    a generally cylindrical stator shaft having a first end section connected to a sector of a torque converter and a second end section, said stator shaft being made of steel;
    an oil pump assembly disposed around said stator shaft and including a pump housing, a pump element movably disposed in said pump housing, and a pump cover made of light alloy and fixedly secured to said pump housing to confine said pump assembly being adapted to discharge hydraulic oil as operating oil for the automatic transmission;
    a boss formed integrally with said pump cover and made of said light alloy, said boss axially protruding in a direction opposite to said pump housing, said stator shaft second end section being fitted inside said boss and fixedly supported by said boss; and
    a rigid sleeve coaxially fitted and fixedly secured on an outer periphery of said boss and made of a material higher in mechanical strength than said light alloy.

12. An automatic transmission as claimed in claim 11, wherein an extreme end of said stator shaft second end section is positioned inside an extreme end of said boss.

13. An automatic transmission comprising:
    a generally cylindrical stator shaft connected to a stator of a torque converter and made of steel;
    an oil pump assembly disposed around said stator shaft and including a pump housing, a pump element movably disposed in said pump housing, and a pump cover made of light alloy and fixedly secured to said pump housing to confine said pump element between it and said pump housing, said oil pump assembly being adapted to discharge hydraulic oil as operating oil for the automatic transmission;
    a boss formed integrally with said pump cover and made of said light alloy, said boss axially protruding in a direction opposite to said pump housing, said stator shaft being fitted inside said boss; and
    a rigid sleeve coaxially fitted and fixedly secured on an outer periphery of said boss and made of a material higher in mechanical strength than said light alloy, said material being selected from a group consisting of iron alloy and steel.

14. An automatic transmission comprising;

a generally cylindrical stator shaft connected to a stator of a torque converter and made of steel;

an oil pump assembly disposed around said stator shaft and including a pump housing, a pump element movably disposed in said pump housing, and a pump cover made of light alloy and fixedly secured to said pump housing to confine said pump element between it and said pump housing, said oil pump assembly being adapted to discharge hydraulic oil as operating oil for the automatic transmission;

a boss formed integrally with said pump cover and made of said light alloy, said boss axially protruding in a direction opposite to said pump housing, said stator shaft being fitted inside said boss;

a thrust bearing disposed coaxially with said stator shaft and located between an end face of said boss and an annular member disposed coaxially with said stator shaft and said annular member secured to an input shaft connected to a turbine of the torque converter; and a rigid sleeve coaxially fitted and fixedly secured on an outer periphery of said boss and made of a material higher in mechanical strength than said light alloy, said rigid sleeve projecting over the end face of said boss and extending to surround a part of said thrust bearing.

15. An automatic transmission as claimed in claim 14 wherein a part of said rigid sleeve projects over the end face of said boss, and said thrust bearing has a race fitted inside said projecting part.

16. An automatic transmission as claimed in claim 14, wherein said rigid sleeve is formed with an oil hole through which oil is supplied to said rigid sleeve and a bearing bushing.

* * * * *